*INVENTOR.*
ALVIN N. DEDRICKS
LESTER A. MUELLER
BY

*ATTORNEY*

INVENTORS.
ALVIN N. DEDRICKS
LESTER A. MUELLER
BY
ATTORNEY.

March 4, 1969  A. N. DEDRICKS ET AL  3,430,452
ICE CUBE MAKING APPARATUS

Filed Dec. 5, 1966  Sheet 6 of 7

INVENTORS.
ALVIN N. DEDRICKS
LESTER A. MUELLER
BY
ATTORNEY.

Fig. 16

United States Patent Office 3,430,452
Patented Mar. 4, 1969

3,430,452
ICE CUBE MAKING APPARATUS
Alvin N. Dedricks, Manitowoc, and Lester A. Mueller, Kewaunee, Wis., assignors to The Manitowoc Company, Inc., Manitowoc, Wis., a corporation of Wisconsin
Filed Dec. 5, 1966, Ser. No. 599,234
U.S. Cl. 62—138                    29 Claims
Int. Cl. F25c 1/10, 1/12

ABSTRACT OF THE DISCLOSURE

A waterfall type of frozen product making device is provided wherein the liquid starting material is introduced at the top of a freezing grid which directs the water in a tortuous path toward a sump. The frozen product collects on the freezing grid and is sensed by suitable means to defrost the grid whereupon the frozen product is discharged therefrom into a bin. Control means associated with the bin are provided to control the operation of the device to insure a constant supply of frozen product.

---

The present invention pertains, generally, to a method of and apparatus for making and storing relatively small chunks of ice of uniform shape and size known generally as "ice cubes," and more particularly, to a machine or apparatus employing a method or process for continuously and automatically making and storing substantial quantities of high quality ice cubes.

There is currently being formulated, by the National Sanitation Foundation, standards of cleanliness relating to automatic frozen food product making machinery or apparatus, to which manufacturers must conform in order to obtain a seal of approval from the foundation. Included in these standards are requirements such as the accessibility of the parts or components of the apparatus for proper and thorough cleaning and visual inspection, and the removability of the parts or components from the apparatus without the use of simple implements, or even the use of tools.

Having in mind the foregoing, it will be understood that a primary object of the present invention is to provide a machine or apparatus for making ice of various configurations, such as cube-shaped, that is constructed and arranged to conform with the requirements of the standards of the National Sanitation Foundation with respect to ease of removal, for example, as well as with respect to maintaining the component parts thereof in a clean condition.

Another primary object of this invention, in addition to the foregoing objects, is to provide a machine or apparatus for making ice of various configurations, having an ice cube-making unit disposed in an isolated relationship with respect to other portions of the apparatus, and which can be completely and easily assembled, disassembled, or replaced without the use of special tools.

Yet another primary object of the present invention, in addition to each of the foregoing objects, is to provide machinery or apparatus for fabricating pure ice having various configurations, and comprising an ice-making section that is constructed and arranged with a minimum of moving or operating parts to insure the reliable operation thereof, and to require very little maintenance.

In addition to the foregoing objects, it is a primary object of this invention to provide machinery or apparatus for fabricating an ice product of varying configuration, such as in cube or block form, comprising readily removable but yet fixedly positioned mold and liquid fountain structure supported by a housing assembly, said housing assembly being constructed and arranged to direct excess liquid from the mold to a readily removable but yet fixedly positioned sump for recirculation.

A further primary object of this invention, in addition to each of the foregoing objects, is to provide machinery or apparatus for fabricating an ice product of different configuration, such as in cube or block form, that is constructed and arranged to remove mineral and other impurities in the liquid with only a minimum loss thereof, as further constructed and arranged to obtain crystal clear ice products, and to increase the ice product making efficiency by conserving a maximum amount of the liquid used.

Still further, it is a primary object of the present invention, in addition to each of the foregoing objects, to provide machinery or apparatus for fabricating an ice product of various shapes, such as in block or cube form, that is constructed and arranged to conserve and retain a maximum amount of the excess liquid from each flushing cycle that was not frozen during the ice product making process, enabling said machinery or apparatus to utilize excess chilled liquid from the ice product making process to pre-cool incoming liquid, thus increasing the efficiency thereof.

Other objects and important features of the present invention will be apparent from a study of the specification following taken with the drawings which together show, illustrate, describe and disclose preferred embodiments or modifications of the present invention, and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

Figure 1:
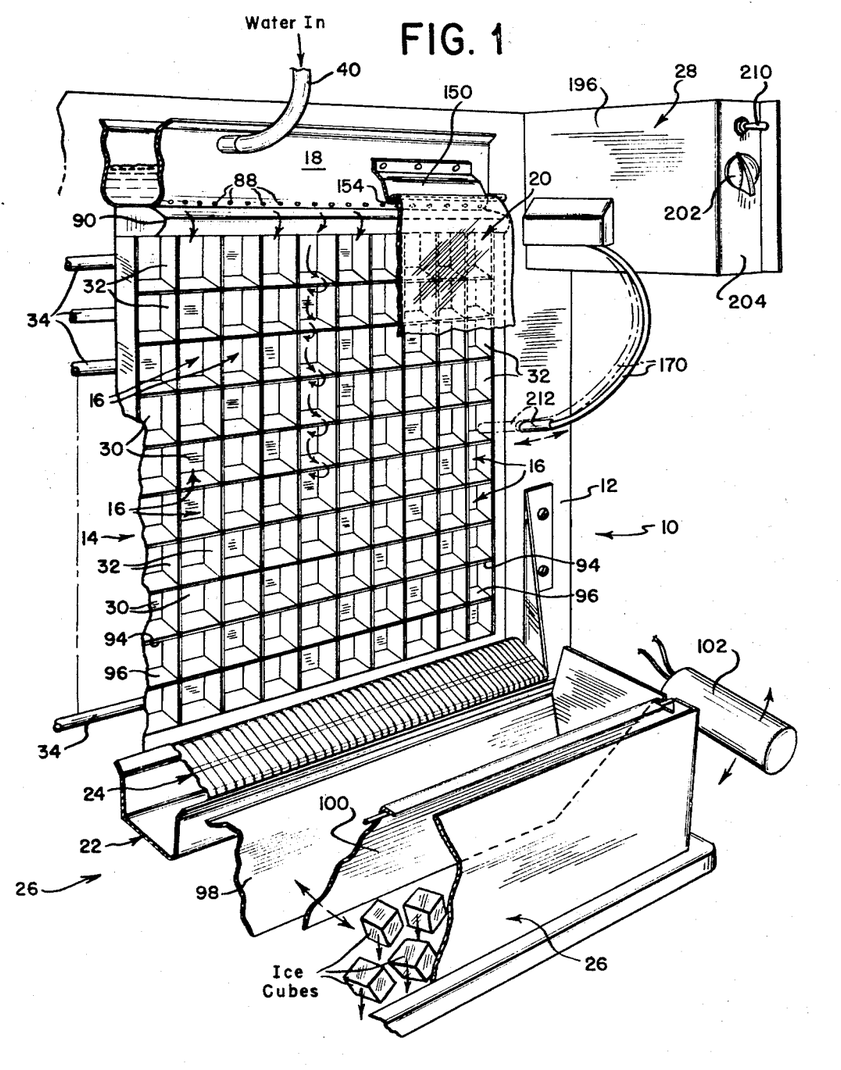
FIG. 1 is a perspective view partly broken away, illustrating the vertically disposed waterfall ice product making machinery or apparatus constructed in accordance with the principles of the present invention, wherein the construction of the outer well portion or cabinetry is not shown.
Figures 2, 3, 4:
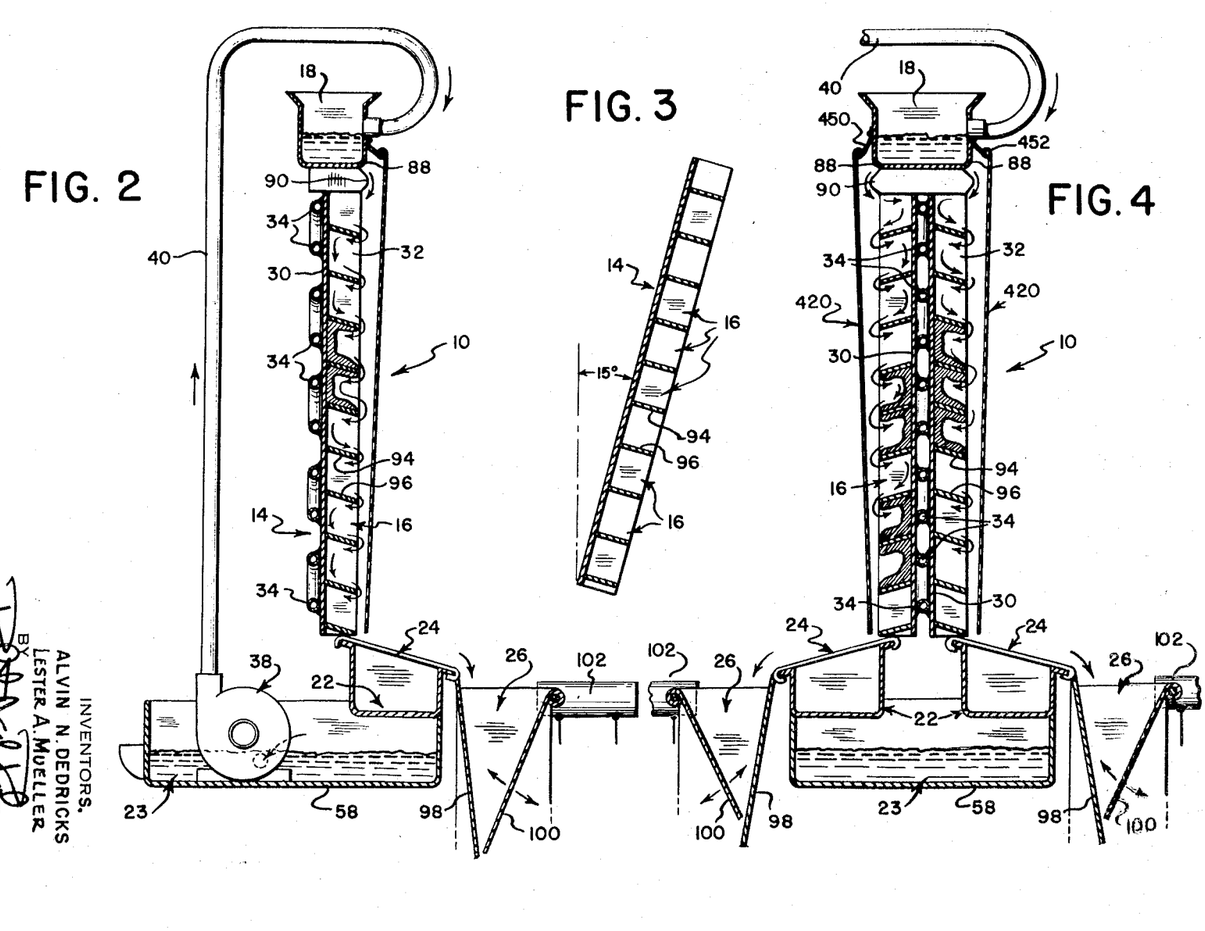
FIG. 2 is an end or side view of the machinery or apparatus illustrated in FIG. 1, but illustrating the elements shown therein schematically.
FIG. 3 is a schematic end view of a modification of the ice cube machinery or apparatus of FIG. 1 wherein the mold containing the cells for making the ice product is disposed in angular relationship with respect to the vertical.
FIG. 4 is a schematic side elevational view similar to that of FIG. 2, but illustrating therein a plurality of ice product molds disposed in back-to-back relationship with respect to one another, enabling a single refrigerant or evaporator coil to be disposed between and suitably fastened thereto.

With reference now to the drawing, and particularly to FIGS. 1 and 2 thereof, there is shown therein a generally vertically disposed waterfall type of ice product making machinery or apparatus 10 comprising a main frame 12, and an evaporator grid or freezing mold 14.

The grid or mold 14 comprises a generally rectangular structure having a plurality of parallel rows of inclined or generally downwardly opening freezing cups or cells 16 formed therein. The cells 16 are each preferably of rectangular cross-section, having a back wall 30 lying substantially parallel to the vertical plane, and having suitable side walls 32. The top and bottom walls of the cells 16 are preferably inclined at an angle of approximately 15° to the horizontal. The grid or mold 14 preferably is fabricated of a heat conducting material, such as aluminum or the like, and refrigerant or evaporator tubes 34 are initially cast in the mold, or are securely fastened to the back surface thereof. The refrigerant tubes 34 are connected either by flexible piping or conventional disconnectable coupling means to a conventional refrigerating apparatus (not shown), the details of which form no part of the present invention.

A water supply trough 18 is mounted atop the freezing mold 14 as clearly shown in FIG. 2. The trough 18 is provided with a water supply pipe 40 and with a plurality of water outlet apertures 88 in a side adjacent the lower edge thereof. A curved plate 90 extends from a location immediately beneath the apertures 88 to a location adjacent the top wall of the uppermost row of the cells 16.

A drain trough 22 is disposed below the lower portion of the freezing mold 14 to catch any chilled but unfrozen liquid which falls from the mold 14 to convey same to a sump 23, to be described more fully hereinafter. Mounted above the trough 22 is a product deflecting rack or grid 24 which permits the cooled but unfrozen liquid to fall into the trough 22 but serves to deflect the falling frozen product to a product collecting zone, also to be more fully described hereinafter.

While a specific and preferred configuration of the freezing cells 16 has been shown and illustrated, it is to be understood that the cells may be of any suitable and desired shape or configuration. The only criteria is that the ice products formed within the cells 16 be capable of sliding freely therefrom under the influence of gravity when the freezing cycle has terminated, and the grid or mold 14 is "defrosted" in any suitable manner. This, for example, may be accomplished by reversing the refrigerant flow to effect a slight warming of the back and side walls of each cell to free the ice product therein.

The ice product machinery or apparatus of the present invention may be mounted or disposed in a suitable enclosure or cabinet (not shown), which for example may be similar in construction to the cabinet described, disclosed, shown and illustrated in the above-identified co-pending application. Accordingly, such enclosure or cabinet structure is not described and disclosed herein in great detail. However, if such a detailed disclosure is desired, reference may be had to such co-pending application. Additional features and elements of the present invention may also readily be ascertained from a reading of the aforesaid co-pending application. Therefore, such additional features and elements will only be disclosed, described, shown and illustrated herein to a degree and extent necessary to facilitate an understanding of the present invention.

Figure 5:
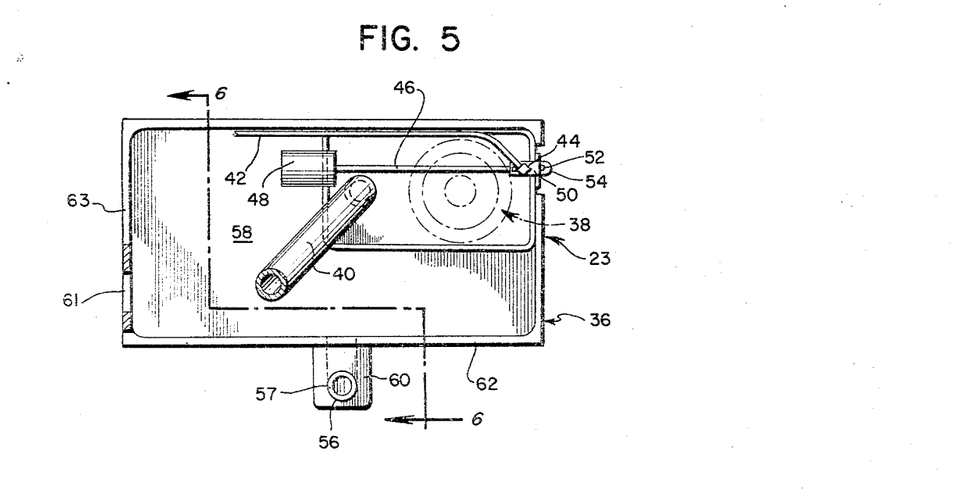
FIG. 5 is a plan view looking in the direction of the water supply structure of the present invention, illustrating the control features therefor.

With particular reference now to FIG. 5, there is clearly shown and illustrated therein a sump assembly 23 comprising a suitable flat-bottomed water sump or reservoir 36 of relatively small transverse area disposed below the freezing mold 14 shown in FIG. 1. The sump 36 preferably is formed of a suitable plastic material, such as polyolefin, polyamide, or polyvinylchloride, or the like, though it is to be understood that the sump may be fabricated of any suitable material, and may even be fabricated of a metal, such as aluminum. A unitary pump and motor unit 38 is removably positioned within the sump 36, and comprises a pump (not shown) that is vertically spaced from the bottom of the sump, and a motor (not shown) which may be of any suitable and conventional construction. The motor is positioned over the pump and is disposed in driving relationship with respect thereto in any suitable manner.

The water supply pipe 40 is connected, at the lower end thereof, to the water discharge end of the water pump (not shown). A water feed pipe or conduit 42 is connected to the sump 36 through the medium of a valve 44 which is controlled by a pivoted arm 46 having a float 48. The float is adjustably mounted upon the arm 46 at the free end thereof, and is disposed within the sump 36. The valve 44 is readily disconnected from the water feed pipe 42 and is removably supported on the upper portion of one side of the sump 36 by a horizontally positioned plate member 50 having a vertical pin 52 slidably and snugly received in a stirrup bracket 54 fixedly secured on the sump 36.

Figure 6:
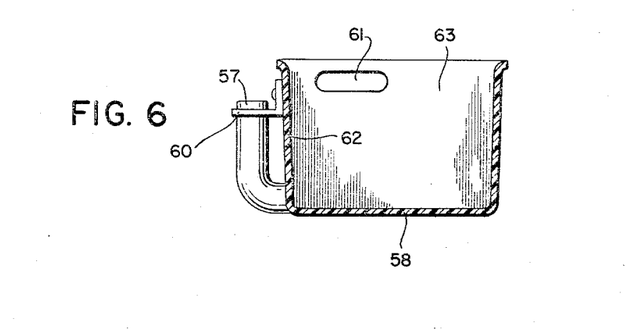
FIG. 6 is a sectional view taken along line 6—6 of FIG. 5.

As clearly shown in FIGS. 5 and 6, a vertically positioned, L-shaped overflow pipe 56 having a top edge 57 is connected to the sump 36 adjacent the bottom wall portion 58 thereof, and is held rigidly in position by a brace member 60 attached to the side wall 62 of the sump 36.

The line C in FIG. 6 corresponds to the liquid level maintained by the float valve 44 while the line D corresponds to the level of the top edge 57 of the overflow pipe 56. Obviously, when the liquid level rises above the line D, the liquid will be forced from the bottom of the sump 36 to flow out over the top edge 57 of the overflow pipe 56.

A suitable overflow opening 61 is provided in another side wall 63 of the sump 36 near the upper portion thereof, and is spaced a predetermined distance above the top edge 57 of the overflow pipe 56 to spill excess liquid in the event the overflow pipe 56 cannot accommodate all of the waste liquid fast enough.

Figure 8:
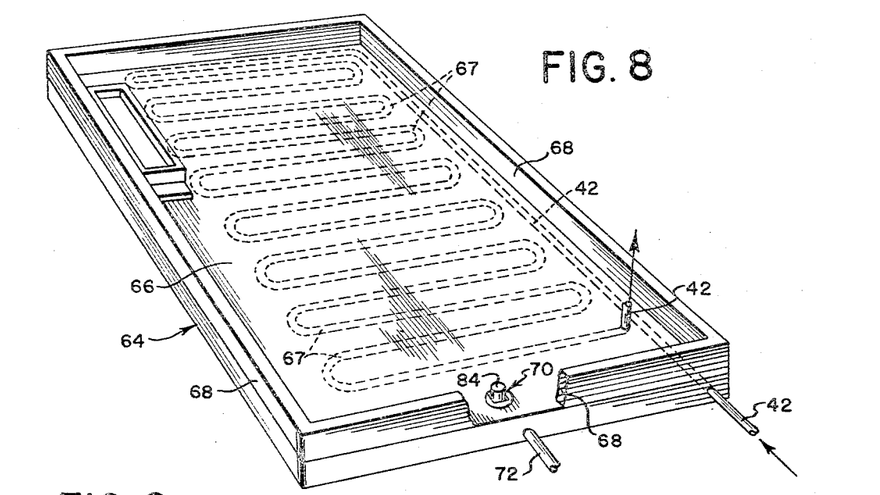
FIG. 8 is a perspective view of a tray or receptacle which can be incorporated into the ice product making machine or apparatus of the present invention to receive excess cooled liquid from the freezing mold for pre-cooling incoming liquid passing therethrough.

With particular reference now to FIG. 8 of the drawing, there is shown and illustrated therein a water regenerative or precooling receptacle or tray 64 formed of a suitable heat conducting plastic or metallic material, which may be utilized with the instant ice cube making machinery or apparatus in its preferred or modified forms. The regenerative tray 64 could, for example, be positioned or mounted in any suitable manner beneath the sump 36 to receive excess cooled water falling from the overflow pipe 56 or the overflow opening 61 in a manner to be hereinafter more fully described.

The tray 64 comprises a base 66 in which there is disposed a cooling coil 67, one end of which is connected to the water feed pipe 42, and the other end of which preferably is connected to the balance of the water feed pipe 42 extending to the float controlled valve 44. A raised wall 68 surrounds the tray 64 to retain therein the excess cooled water entering the tray 64 from the overflow pipe 56 or the overflow opening 61. This cooled water functions to precool the incoming water in the water feed pipe 42 as it passes through the cooling coil 67 in the base 66 of the tray 64, thereby increasing the efficiency of the instant ice cube making mechanism or apparatus.

Figures 9, 10:
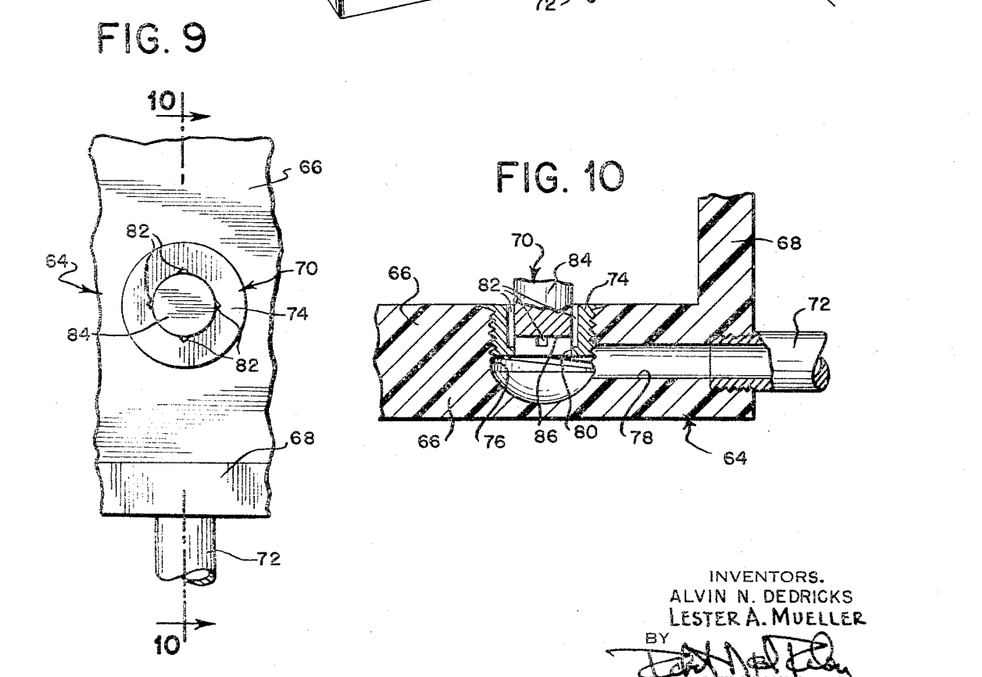
FIG. 9 is an enlarged fragmentary plan view of a control valve provided in the base of the pre-cooling tray shown in FIG. 8.
FIG. 10 is a longitudinal sectional view taken substantially along line 10—10 of FIG. 9.

As clearly illustrated in FIGS. 8–10, the regenerative tray 64 preferably is provided with a drain valve 70 which allows the excess cooled water to gradually drain from the tray 64 into a waste connection 72 at a rate which will permit the absorption of heat from the incoming liquid in the cooling coil 67 to precool the same yet will drain the tray 64 before the end of the subsequent cycle. The drain valve 70 comprises an externally threaded, generally cylindrical hollow valve member 74 which is threaded into an opening 76 in the base 66 of the tray 64 disposed in communication with a bore 78 leading to the drain conduit 72. The interior surface 80 of the valve member 74 is radially relieved or enlarged at spaced intervals therearound to form drain channels 82 therein. A solid, generally annular plug 84 is disposed within the valve member 74 and is in frictional engagement with the interior surface 80 thereof, the bottom 86 of the plug 84 being disposed above the termination of the drain channels 82 adjacent the bottom portion of the valve member 74. The excess, cooled water in the tray 64 may thus drain through the channels 82 in the valve member 74 past the plug 84 and into the waste connection 72 at a predetermined rate determined by the depth of the plug 84 in the valve member 74.

While the regenerative tray 64 has been described and disclosed herein as a modification of the ice cube making apparatus shown and illustrated in FIGS. 1 and 2, it will be understood that it is a preferred modification of the apparatus of the present invention since it results in increased efficiency. It will be understood, in addition, that the tray 64 may be disposed or positioned at any suitable location with respect to the apparatus of this invention, the only criteria being that the tray 64 should be disposed to receive the excess cooled water from the overflow pipe 56 or the overflow opening 61 of the sump 36. Additionally, the cooling coil 67 of the tray 64 preferably is connected to the water feed pipe 42 to cool the incoming water, while the waste connection 72 extends to a suitable sewer drain.

A product deflecting rack or grid 24 is preferably disposed on an incline with the upper edge portion thereof underlying the freezing mold 14 and with the lower edge portion thereof disposed above a product receiving trough 26 whereby frozen product falling thereon from the cells 16 of the mold 14 will slide to a receiving trough 26. The product receiving trough 26 comprises a fixed wall 98 and a movable wall 100 which is pivoted adjacent the upper edge portion thereof. Attached to the movable wall 100 is a position sensing switch 102 which responds to deflection of the wall 100 to make or break an electrical circuit. The wall 100 is biased so that the lower edge portion thereof normally rests against the fixed wall 98 forming a V-shaped trough therewith.

It will thus be seen that when frozen product falls into the trough 26, the movable wall 100 will be deflected to allow the product to fall through and then will again assume its normal position but in so moving, will momentarily actuate a switch 102 for a purpose to be described.

Figures 11, 12:
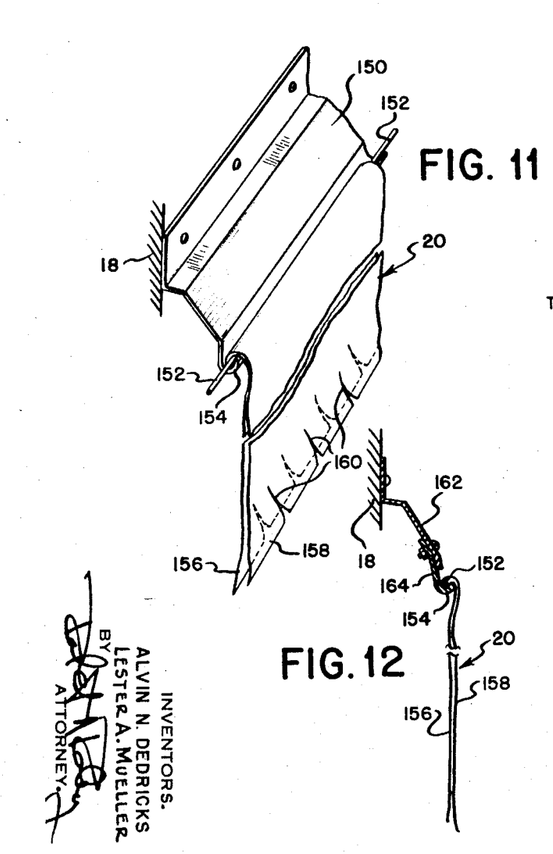
FIG. 11 is a perspective view showing a modification of the water deflector assembly of FIG. 1.
FIG. 12 is an enlarged fragmentary sectional view of the splash shield or water deflector assembly shown in FIG. 11.

A splash shield or water deflector assembly 20 is shown in FIG. 1 and illustrated in greater detail in FIG. 11. As shown therein, a single deflector plate 150 is secured to the upper wall portion of the freezing mold 14 in any suitable manner. The water deflector 20 comprises a rod 152 formed of any suitable material which rests in a hooked or curved portion 154 of the plate 150. Integrally connected flexible sheets 156 and 158 which may be fabricated of any suitable plastic or other water repellent material extend over the rod 152 and downwardly from the hooked or curved portion 154 of plate 150 a sufficient distance to suitably shield all the rows of cells and just about touch the harvest rack 24. It should also be noted that the flexible sheets 156 and 158 need not be integrally connected and, alternatively, they may be formed separately and may therefore be separately secured to or mounted on the rod 152 in any suitable manner. In order to increase the flexibility of the sheets 156 and 158, each may suitably be provided with a plurality of short laterally staggered slits 160.

A water deflector arrangement that is substantially the same as that shown in FIG. 1 is clearly illustrated in FIG. 12, with the exception that a pair of plates 162 and 164 are utilized instead of the single hooked plate 150 shown in the former.

Figure 16:
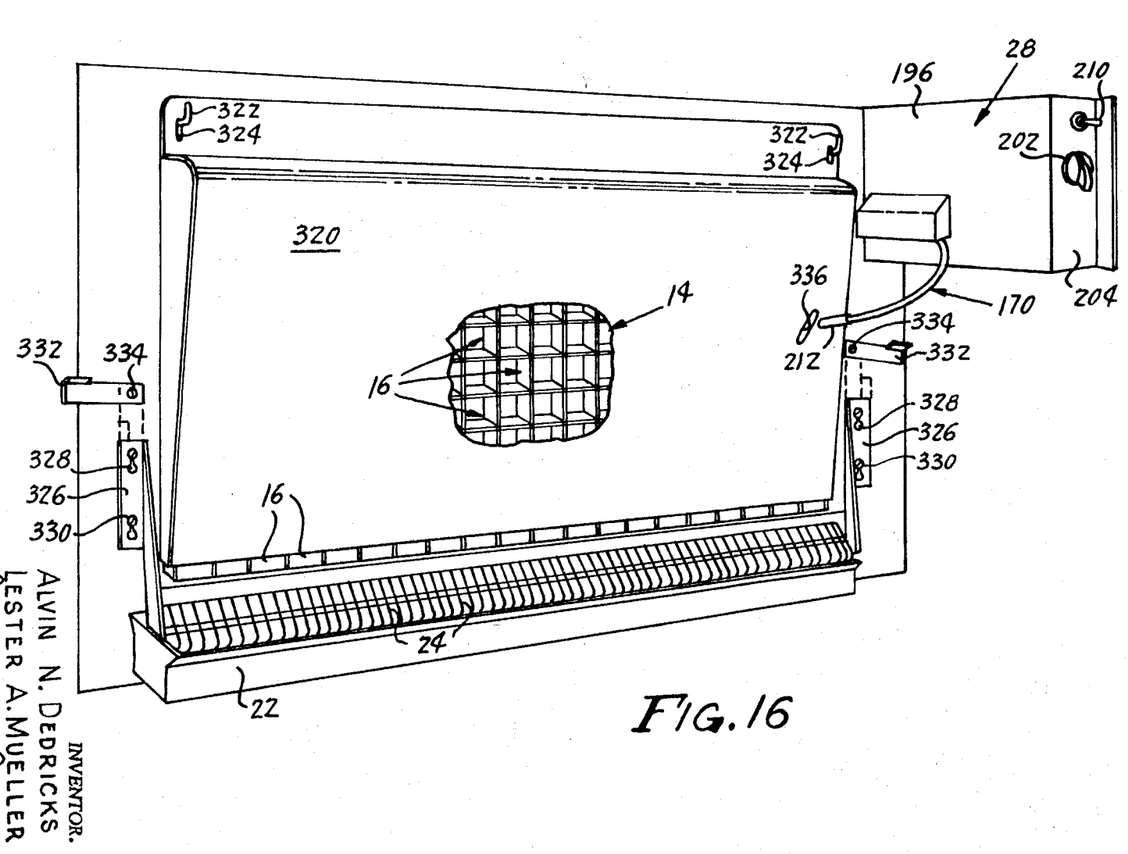
FIG. 16 is a perspective view similar to FIG. 1 of the drawing but illustrating a modification or embodiment of the splash shield or water deflector assembly.

If desired, the water deflector of the machine or apparatus 10 may be bodily rigid rather than bodily flexible, as previously described and disclosed and attention is now directed to FIG. 16 of the drawing wherein there is shown a bodily rigid water deflector 320 which may be formed of plastic or other suitable material which is removably secured to the machine or apparatus 10 by hook-like projections 322 which pass through aligned apertures 324 formed in the water deflector 320.

Further, it is to be noted that the drain trough 22 of the modification or embodiment of the machine or apparatus 10 as illustrated in FIG. 16 is releasably secured thereto by plate-like members 326 each of which are provided with a plurality of bayonet type slots 328 which receive enlarged projections 330.

In order to retain the plate-like members 326 secured to the machine or apparatus 10 with the enlarged projections 330 being in the similar portion of the respective bayonet type slots 328, a locking device 332 is provided that is pivotally mounted through a pivot 334 and as illustrated the locking device 332 is shown in solid lines in FIG. 16 as being in a position to enable the drain trough 22 to be removed from the machine or apparatus 10 and in dotted lines as being disposed in the locking position for retaining the plate-like members 326 in engagement with the enlarged projections 330.

The bodily rigid water deflector 320 is provided with an elongate slot 336, similar to a slot which is provided in the bodily flexible water deflector 20 through which a contoured tip portion 212 of a sensing finger 170, to be explained in more detail hereinafter, may project.

Figure 13:
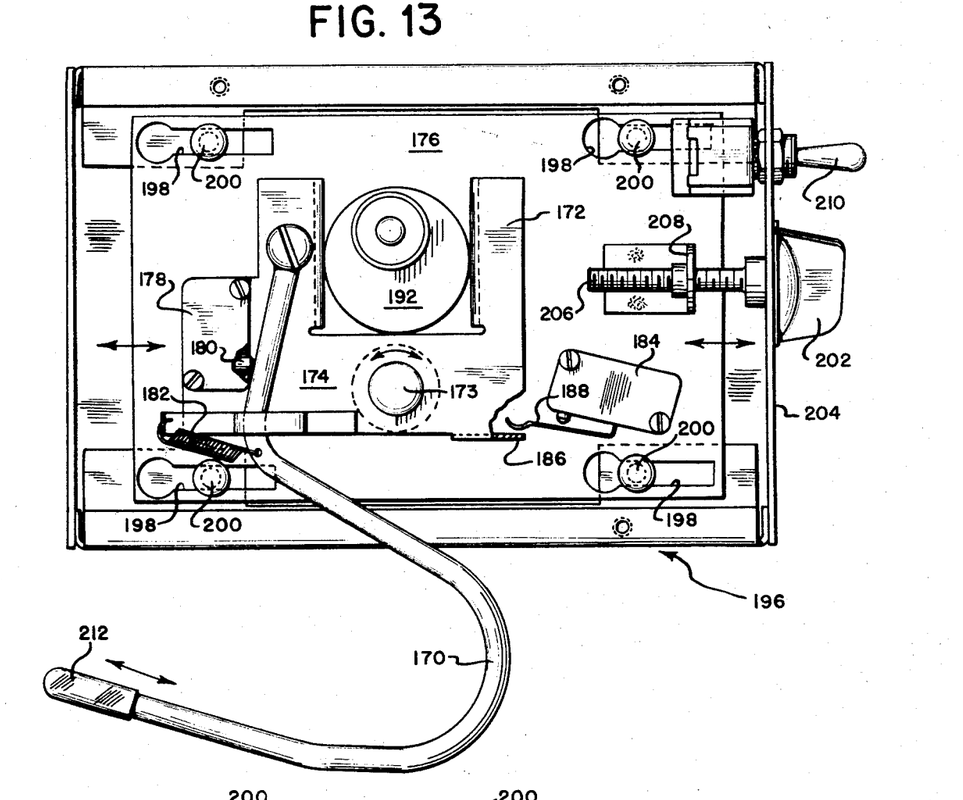
FIG. 13 is a side elevational view looking in the direction of the ice product size sensing assembly, but illustrating the side panelling cover removed therefrom, and showing a single supporting plate.
Figure 14:
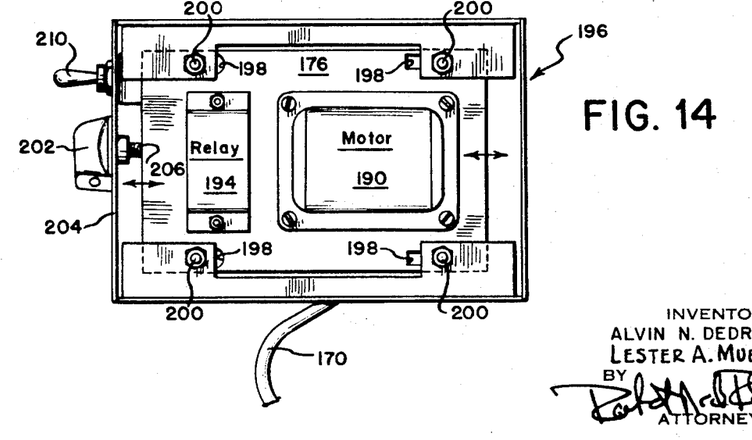
FIG. 14 is a plan view of the supporting plate shown in FIG. 13 but illustrating the opposite side thereof.
Figure 15:
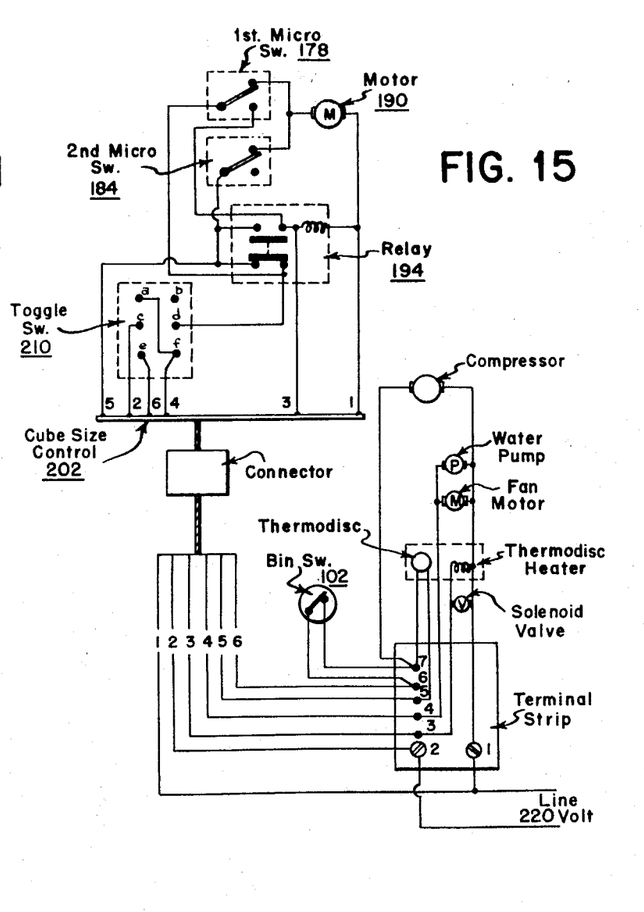
FIG. 15 is an electrical schematic showing the circuitry of the ice product size sensing assembly shown in FIGS. 13 and 14.

With continued reference now to FIG. 1, and with particular reference to FIGS. 13, 14 and 15, there is clearly shown and illustrated therein an ice product size sensing assembly 28. An outwardly extending probing and sensing finger 170 is suitably driven in a generally oscillating manner by the product size sensing assembly 28, enabling the finger to move into and out of one of the pockets or cells 16 or contact any portion of the ice which is being formed in the freezing mold 14. The sensing finger 170 is pivotally connected to a yoke, bifurcated member or U-shaped cam follower 172 which is in turn pivotally connected to a supporting plate 176 by means of pin 173 located at the lower portion or yoke 174 of the plate 176. Supported on the cam follower 172 is a first switch, such as a double throw micro switch 178 held in actuated position by the sensing finger 170 which is suitably biased against its contact actuator 180 by suitable spring means 182. A second switch, such as micro switch 184 is secured to the supporting plate 176 and is operated by an extending portion 186 of the cam follower 172 which forces the actuating arm 188 of the micro switch 184 to open the switch.

A suitable timing gear motor or clock motor 190 is mounted upon the opposite side of the supporting plate 176, as clearly illustrated in FIG. 14. The motor 190 is particularly adapted to drive the cam 192, shown in FIG. 13, at a predetermined rate. A suitable single pole double throw relay 194 is fixedly disposed adjacent the clock motor 190 on the same side of the supporting plate 176. The entire supporting plate 176 is adjustably supported within the product size sensing assembly box 196 by means of mating slots 198 and pins 200. A product size selector or control knob 202 rotatively secured to the front panel 204 and having a threaded rod 206 extending therefrom is threadably connected to a bracket 208 fixedly secured to the supporting plate 176. By turning the control knob 202, the supporting plate 176 is caused to translate back and forth. A suitable two pole three-way toggle switch 210 is also secured to the front panel 204, and the sensing finger 170 is suitably provided with the contoured tip portion 212 made of a plastic material.

In operation, the first micro switch 178 is normally closed in the clock motor circuit and the sensing finger 170 is normally moving into and out of a cell 16, since the driven cam 192 drives the cam follower 172 upon which is disposed the sensing finger 170. When the product makeup is such that it approaches the thickness selected by the control knob 202, then the first micro switch 178 will be momentarily reversed because the thickness of the product forces the sensing arm away from the switch 178. This will momentarily energize relay 194 which then stays energized by its holding circuit. Energizing the relay causes the pump 38 to stop and the hot gas valve to be energized. The motor 190 continues to run until the cam follower 172 opens the second or homing micro-switch 184, thus enabling the sensing finger 170 to withdraw outwardly of the product that has accumulated in the cell 16 through the medium of the position of the cam 192 and cam follower 172. The sensing finger 170 also clears the water deflector 20. The product thus formed in the cells 16 is caused to drop out of the cells and on to the harvest rack 24 when the hot evaporator tubes 34 begin to melt the contacting surfaces between the product and the walls of the cells 16. The relay 194 stays energized until the falling product causes the mercury switch 102 to open thereby opening the holding circuit, whereby the relay 194 becomes de-energized enabling the pump and motor unit 38 to start again as soon as switch 102 recloses and de-energizing the hot gas solenoid valve (not shown). The solenoid valve, when open, enables the discharge gas of the refrigerating unit's compressor to pass directly into the evaporator tubes 34 in a well known manner thereby rapidly warming the mold 14 and causing the ice product to drop out of the cells 16.

By employing the above described and disclosed sensing arrangement instead of a more conventional type of thermostatic control, the machine or apparatus 10 will operate in temperatures where a thermostatic type device would be affected by existing room temperatures and thus prove to be unreliable. The sensing arrangement of the instant inventive concept will sense the same thickness of ice during each cycle of operation of the machine or apparatus 10 irrespective of the environmental temperatures in which the machine or apparatus 10 is operating.

In describing the operation of the instant apparatus, it is assumed that the sump 36 is initially filled with a liquid to a level corresponding to that of line C of FIG. 6. The float 48 is initially adjusted along the pivoted arm 46 so that the arm 46 will close the valve 44 to terminate the flow of water into the sump 36 from the water feed pipe 42 when the level of the float 48 corresponds to line C. It will also be assumed that the mold cells 16 are emptied of the ice product, that the pump and motor unit 38 are energized in a conventional manner, and that refrigerant for freezing the liquid entering the mold cells 16 is flowing through the evaporator tubes 34.

The liquid is pumped by the pump and motor unit 38 of the re-circulation system from the sump assembly 23 to the spreader trough 18 atop the freezing mold 14. The liquid drains out of the spreader trough 18 through the apertures 88 in the bottom thereof, and then flows onto the curved plate 90 whereon it follows the curve of the plate and flows uphill to the bottom of the cups or cells 16 of the upper row of the mold 14. Since the liquid flows gently and in a thin film, it then flows uphill into the pocket of each of the cells 16 by means of capillary action and surface tension to the back walls 30, and then down the back walls 30 and back out of the cells 16 and uphill again into the cells 16 of the next adjacent row of cells. Because of the gentle flow of the liquid, a portion readily freezes in the cells 16 and the remainder becomes chilled. At first there may be some tendency of the liquid to splash out of the cells 16, but as ice begins to form therein, it forms into curves which the liquid more readily tends to follow. Thus, the flowing liquid soon begins to flow in a sinusoidal or continuous S-shaped waterfall path, as clearly illustrated in FIG. 2.

Since liquid which contains dissolved impurities generally freezes at a lower temperature than does substantially pure liquid, the liquid which freezes in the cells tends to be more pure than the remainder while the remainder tends to become more concentrated with impurities. In this way the frozen product formed in the cells 16 tends to remain pure while the impurities are flushed away to the trough 22 and the sump assembly 23. Because the density of the returning liquid containing concentrated impurities is greater than that of the fresh liquid entering the sump assembly 23 from the float valve 44, the concentrated impurities tend to remain in the bottom of the sump assembly 23. It will readily be seen that as a portion of the circulating liquid freezes in the mold cells, the float valve 44 will admit additional liquid to the sump 36 to maintain the predetermined level.

When the frozen product has built up to the desired size, as determined by the setting of the control knob 202 of the sensing device 28, the pump and motor unit 38 is shut off and the hot gas valve is activated to allow hot gas to enter the evaporator in a conventional manner.

When the pump stops, the liquid in the supply pipe 40 drains back to the sump assembly 23 through the pump and the liquid in the trough 18 drains through the apertures 88, down the face of the mold 14 to the trough 22 and back to the sump assembly 23, thus raising the level of liquid in the sump assembly 23 above the level D of the top 57 of overflow pipe 56. The impure liquid which is concentrated in the bottom of the sump assembly 23 is thus forced out the overflow pipe 56 until the level in the sump again reaches level D. It will be noted that since level D is above the float controlled level C, no fresh liquid is admitted to the sump 36 during this period. The liquid which overflows falls into the regenerative tray 64 from which it is allowed to gradually escape by the drain valve 70. Because this waste liquid has already been chilled almost to its freezing point, it absorbs heat from the incoming liquid in line 67, thus serving to precool the incoming liquid while removing heat in the waste liquid.

When the evaporator has been sufficiently warmed by the hot gas to melt the edges of the frozen cubes, the cubes slide down the inclined walls of cells 16 and drop onto the grid 24 which deflects them to the product receiving trough 26 wherein they actuate the switch 102 to interrupt the holding circuit of relay 194 to restart the cycle.

It is to be noted that in the present machine, a certain amount of bridging of frozen product over the cell dividers occurs as the cells 16 themselves become filled. This bridging has been found to be desirable since it causes the entire harvest to be released from the mold 14 at once and the product is released as a sheet which is serrated into cubes. Thus the cubes which release first tend to pull the slower releasing cubes out of the cells 16. The bridging is broken when the sheet falls onto the rack 24 and into the trough 26.

Because of the above described bridging, a preferred modification of the instant machine comprises locating a sensing device 28 so that a finger 212 senses the amount of bridging between cubes rather than actual cube size.

Referring now to FIGURE 15, it will be seen that bin switch 102, which is attached to the movable wall 100, is wired in series with all other electrical components of the machine. Accordingly, when the storage compartment is nearly filled, a subsequent harvest of ice falling into the trough 26 will deflect the movable wall 100, opening the switch 102, but the ice will not be able to fall through because of the level of ice in the storage compartment. The movable wall 100 and the switch 102 will thereby be held in their respective open positions causing the machine to stop until ice is removed from the storage compartment thus allowing the movable wall 100 to close and with it the switch 102 to restart the machine. The movable wall 100 and the switch 102 thus function as both a harvest completion sensing control and a "full bin" sensing control.

In FIGS. 3 and 4, there are illustrated therein modified forms of the waterfall ice product apparatus of the present invention. As clearly illustrated in FIG. 3, the freezing mold 14 is suitably disposed at an angle with the vertical, such as about approximately 15 degrees. In this manner, the top and bottom walls of the cells 16 may be disposed in perpendicular relationship with the back wall thereof, and yet the formed ice product will readily slide out of the cells upon being released therefrom because the entire mold is disposed at an angle. In this construction, the ice product can be formed in an exact cube or rectangular shape, whereas in the embodiment of FIGS. 1 and 2, the ice product preferably is of rhomboidal configuration. As clearly illustrated in FIG. 4, a plurality of freezing molds 14 are disposed in back-to-back relationship with respect to one another, a single evaporator coil 34 being positioned therebetween. The evaporator coil 34 can be fixedly secured to the rear walls of each freezing mold 14 in any suitable manner, as through the medium of soldering, and the like. It will be understood, therefore, that this embodiment will produce an increased output. It will further be understood that one or more freezing molds may be positioned or disposed within a basic housing of standard size to define a vertically disposed waterfall type of ice product making apparatus in accordance with the principles of the present invention, the output of such apparatus thus being determined in accordance with the number of freezing molds.

Also as shown in FIGURE 4, another form of the splash deflector device 420 is illustrated as having a bodily rigid deflector sheet pivotally mounted to support 450 by a hinge member 452.

As has heretofore been emphasized, it is important that all of the various component elements of the ice product making apparatus of the present invention be readily accessible and easily removable by hand or without the need of special tools for cleaning or for any other purpose. This is exceedingly important since special solutions are normally required, for example, in cleaning the sump 36 and pump and motor unit 38. By having the pump and motor unit 38 readily removable, such solutions are prevented from being circulated throughout the entire ice product making system of the instant apparatus. Under these conditions, it is thus necessary to remove the ice product from the storage bin 26 when the pump and motor unit 38 is to be cleaned.

It is also to be noted that switch 210 on the sensing control has, in addition to the "normal run" position wherein terminals c and d are connected to terminals e and f respectively, an "off" position wherein none of terminals a, b, c, d, e or f are connected to each other. Switch 210 also provides a cleaning position wherein terminals c and d are connected to terminals a and b respectively. In this condition only the water pump and the fan motor are operative to circulate such cleansing solutions as may be used to remove accumulated material from the refrigeration system.

Of interest, the spreader trough 18, water deflector 20, the drain trough 22, the harvest rack 24, the storage bin 26 as well as the water pump (not shown) of the apparatus may all be removed without requiring the use of any tools in approximately one minute and reinstalled into the apparatus or machine in substantially approximately the same time.

Figure 7:
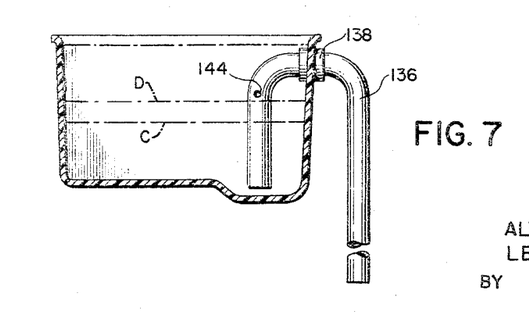
FIG. 7 is an enlarged fragmentary elevational view in section of modified arrangement for controlling the liquid level of the sump to effect periodic partial drainage thereof.

With particular reference now to FIG. 7 of the drawing, there is illustrated therein a modified form of control mechanism for controlling the periodic limited discharge of liquid and settled impurities contained therein from the bottom of the sump 36, particularly adapted for use in lieu of the overflow pipe 56 of the above described preferred embodiment of FIG. 5.

In this embodiment, the flat bottom portion 132 of the sump 130 has a shallow well or depression 134 at one end thereof. A U-shaped siphon tube overflow pipe 136 is supported on a sleeve 138 which extends through an overflow aperture in the upper portion of the end wall 140 of the sump 130 adjacent the well 134 at a level corresponding to the overflow aperture 61 in FIG. 5. The lower end 142 of the siphon pipe 136 within the sump 130 terminates closely adjacent the bottom of the well 134. A smaller aperture 144 is provided in the siphon pipe 136 in the upper portion thereof within the sump 130.

The lower horizontal broken line C in FIG. 7 is indicative of the normal liquid level in the sump 130 as determined by the float-controlled valve 44 shown in FIG. 5. The uppermost point 146 of the siphon pipe 136 is indicative of the overflow height of liquid at which the siphon pipe 136 begins to function to siphon liquid out of the sump 130. The upper broken line D is indicative of the level of the liquid at which the siphoning action of the siphon pipe 136 is stopped because of the uncovering of the aperture 144 therein as the liquid level lowers, enabling the entrance of air into the upper portion of the siphon pipe 136 to interrupt the siphoning action thereof. The lower end of the siphon pipe 136 exteriorly of the sump 130 conducts the overflow discharge into regenerative tray 64.

When the arrangement of FIG. 7 is substituted in the instant ice product making apparatus in the manner described above, the liquid which drains back down into the sump 130 thus raises the liquid level until it rises above the siphon pipe aperture 144. Should the liquid level in the sump 130 reach a level corresponding to the uppermost point 146 of the siphon pipe 136, the siphoning function of the pipe 136 automatically starts and quickly begins to lower the liquid level by conducting liquid with such impurities as may be suspended therein from the lower portion of the sump 130 and the well 134 thereof until it again uncovers the siphon pipe aperture 144 at the level D, thereby automatically interrupting the siphoning function of the pipe 136.

It should also be readily apparent that drain through 22 may be configured to deliver the excess chilled but unfrozen liquid directly into tray 64 and thereby provide for the elimination of the overflow arrangements of sump 23. It will be readily apparent that this modification precludes the admixing of the relatively impure liquid discharging from mold 14 and the relatively pure input liquid moving through inlet conduit 42, while avoiding large heat losses by the heat exchanging characteristics of tray 64.

In accordance with the foregoing, it is considered readily apparent that the herein disclosed ice product making apparatus provides an apparatus having substantially no moving parts, other than the pump and motor unit, and possesses durability, maintained effectiveness, and operating efficiency. It also provides a construction which conforms to the requirements of the National Sanitation Foundation with respect to standards of cleanliness relating to automatic frozen products making machinery or apparatus, as regards the manner in which it can readily and easily be assembled or disassembled, and in view of the ease with which the various components thereof can be removed by hand or with the use of simple conventional tools for the purpose of cleaning or replacing such parts, as above explained.

While the invention has been described and disclosed in terms of several embodiments or modifications which it has assumed in actual practice, the scope of the invention should not be deemed to be limited by the precise embodiments or modifications herein shown, illustrated, described and disclosed, such other embodiments or modifications being intended to be reserved especially as they fall within the scope of the claims appended hereto.

We claim:

1. Apparatus for making a frozen product having a predetermined shape comprising:
   a freezing mold mounted in a relatively fixed generally vertically disposed position,
   evaporator tubes secured to a wall of said freezing mold,
   said freezing mold having parallel rows of cells therein of a shape corresponding to the predetermined shape of such frozen product,
   a liquid fountain disposed above said freezing mold,
   said fountain having a plurality of apertures therein,
   curved plate-like means for directing liquid from said liquid fountain to the upper row of cells of said freezing mold,
   a drain trough disposed subjacent said freezing mold for collecting excess liquid draining therefrom,
   an inclined wire grid disposed across said drain trough serving to convey frozen products formed in said cells to a storage area,
   a liquid deflector secured to the upper portion of said mold and extending generally downwardly alongside said mold,
   a sump having a pump and motor unit releasably mounted beneath said mold,
   said sump being mounted below said pump and having an intake which is disposed above a bottom portion of said sump,
   a liquid supply pipe removably connected at the upper end thereof to said liquid fountain and extending generally downwardly into said sump whereat the lower end thereof is connected to the discharge portion of said sump,
   a liquid feed pipe adapted for releasable connection to a liquid supply source extending into said sump,
   a valve for automatically maintaining the level of liquid in said sump at a predetermined level,
   a float for controlling said valve being disposed within said sump and having an arm connected to said valve for enabling said valve to be closed by said float when the liquid in said sump reaches said predetermined level,
   an overflow pipe having an upper vertical portion secured to a side portion of said sump and having a substantially horizontal lower portion in communication with the bottom portion of said sump to flush liquid and any impurities which may be contained therein from the bottom portion of the sump when the level of liquid in said sump is above the top edge of said upper vertical overflow pipe portion,
   an overflow opening in a side portion of said sump disposed above said top edge of said vertical overflow pipe portion, and
   drainage means to drain overflow liquid from said overflow pipe.

2. Apparatus for making a frozen product of a predetermined shape, comprising
   a freezing mold mounted in a generally vertical position,
   cooling means secured to a wall of said freezing mold,
   said freezing mold having a plurality of rows of cells therein each having a shape corresponding to said predetermined shape of frozen product,
   a liquid fountain disposed above said freezing mold and having a plurality of apertures therein, and
   means for directing liquid from said liquid fountain to the upper row of cells of said mold for enabling liquid to flow generally uphill along a top portion thereof and thereafter down a back and bottom portion thereof and thence generally uphill again to the next adjacent row of cells with liquid continually flowing into said cells and being gradually frozen until a predetermined frozen product is formed in said cells.

3. The apparatus as defined in claim 2, further comprising
   a drain trough disposed subjacent said mold for collecting excess liquid draining therefrom,
   said drain trough being provided with an inclined foraminous member across an open top thereof serving to convey blocks of frozen product formed in said cells to a storage area.

4. The apparatus as defined in claim 2, further comprising
   a liquid deflector secured to an upper portion of said mold and extending generally downwardly alongside said mold, and
   a deflector sheet depending from said deflector with the upper portion thereof removably mounted to the deflector.

5. The apparatus as defined in claim 2, wherein
   a second freezing mold is disposed in back-to-back relationship with respect to the stated freezing mold, and
   said cooling means are secured to the back portion of both of said molds to provide the necessary refrigeration desired to form frozen products in the cells.

6. The apparatus as defined in claim 5, wherein
   said cooling means comprise fluid transmitting conduits for carrying a relatively cool fluid for refrigeration and for carrying a relatively warm fluid for warming said cells to enable said frozen products to be released therefrom.

7. The apparatus as defined in claim 6, wherein
   a product size sensing assembly is secured to said mold,
   said sensing assembly having a sensing finger which senses the necessary signals to reverse the cycle of said apparatus when a predetermined size of frozen product is formed.

8. The apparatus as defined in claim 7 wherein said product size sensing assembly comprises
   support means;
   a motor, on the support means, having a rotating shaft carrying a cam;
   a cam follower, pivotally mounted on said support means, juxtaposed to said cam;
   a switch on said cam follower;
   a sensing finger movably mounted on said cam follower and biased against said switch;
   a hot gas solenoid valve in the fluid transmitting conduits for passing a relatively warm fluid through the conduits; and
   circuit means comprising conducting means connecting said motor, said switch and said solenoid valve for enabling said motor and said cam to drive said cam follower and oscillate said sensing finger into and out of one cell of said mold with said sensing finger being effective upon sensing a predetermined thickness of frozen product in said cell to cause said switch to open and for opening said hot gas solenoid valve.

9. The apparatus as defined in claim 2, wherein
   said cells of said freezing mold are inclined at an angle relative to a horizontal which is sufficient to enable the frozen product formed therein to slide out therefrom, utilizing the force of gravity to move the frozen product, when said cells are heated.

10. The apparatus as defined in claim 9, wherein said angle approximates 15 degrees relative to the horizontal.

11. The apparatus as defined in claim 2, wherein said freezing mold is inclined with respect to the vertical so as to facilitate the release of the frozen product from said cells when said cells are warmed.

12. The apparatus as defined in claim 11, wherein said mold is disposed at an angle of about 15 degrees relative to the vertical.

13. The apparatus as defined in claim 2, further comprising
a liquid regenerative tray connected to a liquid conduit supplying liquid to said sump and is so constructed and disposed as to receive excess cooled liquid therein draining from said freezing mold and said liquid deflector,
said liquid regenerative tray serving to precool the incoming liquid in said liquid conduit as it flows therethrough to said sump.

14. The apparatus as defined in claim 13, wherein said regenerative tray comprises
a cooling coil connected to said liquid conduit so that incoming liquid therein flows through said coil, and
a drain valve in the bottom portion of said tray for constantly draining the excess cooled liquid in said tray at a predetermined rate.

15. A machine for making a frozen product of predetermined shape, comprising
a generally vertically disposed freezing mold having a plurality of vertically spaced cells having an open front, a downwardly inclined upper surface for directing liquid uphill away from the open front, a generally up and down back surface in liquid receiving relation with the upper surface for directing liquid therefrom toward a lower position, and a downwardly inclined lower surface in liquid receiving relation with the back surface for directing liquid therefrom toward the open front for reception by the next lower cell,
a liquid distributor for discharging liquid to the upper cell to form frozen products in the cells,
a device for supplying liquid to said liquid distributor, and
a frame for supporting said freezing mold and said liquid distributor to enable liquid to flow into and out of said cells by means of surface tension and gravity.

16. The apparatus as defined in claim 15, wherein
a second freezing mold is disposed in back-to-back relationship with respect to the stated freezing mold.

17. The apparatus as defined in claim 16, wherein
a fluid transmitting conduit is disposed between said freezing molds for carrying a relatively cool fluid for simultaneously conducting a freezing operation in both of said molds.

18. An assembly for sensing the size of a frozen product in a mold comprising
support means;
a product size sensing finger movably mounted on the support means for extending to a position adjacent a freezing mold;
switch means operable by movement of the sensing finger for controlling a refrigeration-heating complex to heat the freezing mold when the sensing finger actuates the switch means in response to a buildup of frozen product on the mold;
means for holding the sensing finger away from the mold and continually retaining the sensing finger thereat during a substantial portion of the heating cycle to allow the frozen product to exit from the mold; and
means for drivably moving the sensing finger into and out of the mold during at least a portion of the refrigeration cycle for physically sensing the size of the frozen product accumulated therein.

19. The assembly of claim 18 further comprising
means for selectively adjusting the size sensing assembly for actuating the switch means when the sensing finger senses different sized products in the mold.

20. The assembly of claim 18 wherein
the means for drivably moving the sensing finger into and out of the mold comprises
a motor, on the support means, having a rotatable shaft carrying a cam;
a cam follower movably mounted on the support means engaging the cam, the sensing finger being pivotally mounted on the cam follower.

21. In a frozen product making machine of the type having a reversible refrigeration-heating apparatus for alternately preparing a batch of frozen product in a mold and then discharging the product into a bin, the improvement comprising:
a control mechanism comprising
a gate, adjacent the inlet of the bin, mounted for movement between a normal first position substantially closing the bin inlet and a second material transmitting position providing for movement of the frozen product into the bin, and
electrical circuit means having
product size sensing means for terminating the refrigeration cycle when the frozen product reaches a predetermined size and starting the heating cycle to discharge the frozen product from the mold, and
switch means, operatively connected with the gate, for terminating the mold heating cycle when the gate is moved from the first position to the second position, for starting the mold cooling cycle when the gate moves from the second to the first position and for maintaining the refrigeration-heating apparatus in an inoperative condition when the gate is precluded from movement from the second to the first positions because of frozen product accumulation in the bin blocking movement of the gate.

22. The apparatus defined in claim 21, wherein
the product size sensing means is adjustable to vary the predetermined size of the frozen product.

23. The apparatus defined in claim 21, wherein the product size sensing means comprises
support means;
a product size sensing finger movably mounted on the support means for movement between a first position adjacent the mold for sensing the product size and a second position distant from the mold; and
switch means mounted in the path of movement of the sensing finger for controlling the reversible refrigeration-heating apparatus to heat the mold when the sensing finger actuates the switch means in response to a buildup of frozen product on the mold.

24. The apparatus defined in claim 23 wherein the sensing finger is disposed in the mold in the first position.

25. The apparatus defined in claim 23 wherein the mold is comprised of a plurality of cells separated by partitions and the sensing finger is disposed adjacent one of the partitions in the first position.

26. The apparatus defined in claim 21 wherein
the refrigeration-heating apparatus comprises a refrigerant compressor;
the frozen product making machine comprises a liquid material supply having a liquid pump; and
the electrical circuit means further comprises
means for delivering electrical energy to the pump but not the compressor for circulating cleaning fluid through the machine without operating the refrigeration apparatus.

27. In a frozen product making machine of the type having a reversible refrigeration-heating apparatus for alternately preparing a batch of frozen product in a mold and then discharging the product into a bin, the improvement comprising:
support means adjacent the mold;
a product size sensing finger, movably mounted on the support means, extending to a position adjacent the freezing mold;
switch means mounted in the path of movement of the sensing finger for controlling the refrigeration-heating apparatus to heat the mold when the sensing finger actuates the switch means in response to a buildup of frozen product on the mold to a predetermined size;

means in the bin for sensing the movement of frozen product therethrough; and means operatively connected with the bin sensing means for terminating the heating cycle upon passage of frozen product into the bin.

28. The machine as defined in claim 27 wherein the bin sensing means comprises a movable member mounted across the bin inlet and further comprising means for deactivating the frozen product making machine when the movable member is precluded from movement by an overaccumulation of frozen product in the bin.

29. In combination, a freezing mold having a plurality of juxtaposed cells separated by partition means and an assembly for sensing the size of a frozen product in the mold, the assembly comprising support means;

a product size sensing finger movably mounted on the support means for extending to a position immediately adjacent the partition means;

switch means operable by the sensing finger for controlling a refrigeration-heating complex to heat the freezing mold when the sensing finger actuates the switch means in response to a buildup of frozen product on the partition means; and means for holding the sensing finger away from the mold during at least a portion of the heating cycle to allow the frozen product to exit from the mold.

References Cited

UNITED STATES PATENTS

| | | | |
|---|---|---|---|
| 3,350,894 | 11/1967 | Thorner | 62—140 |
| 2,656,686 | 10/1953 | Bayston | 62—137 |
| 2,867,092 | 1/1959 | Perry | 62—140 |
| 2,927,440 | 3/1960 | Kohl | 62—138 |
| 2,934,912 | 5/1960 | Rodgers | 62—137 |
| 2,959,026 | 11/1960 | Swanson | 62—138 |
| 3,020,726 | 2/1962 | MacLeod | 62—138 |
| 3,171,266 | 3/1965 | Weiss | 62—347 |
| 3,206,944 | 9/1965 | Gallo | 62—347 |
| 3,220,207 | 11/1965 | Cordes | 62—138 |
| 3,289,430 | 12/1966 | Dedricks et al. | 62—347 X |

FOREIGN PATENTS

| | | |
|---|---|---|
| 1,156,092 | 10/1963 | Germany. |

ROBERT A. O'LEARY, *Primary Examiner.*

WILLIAM E. WAYNER, *Assistant Examiner.*

U.S. Cl. X.R.

62—347, 137